United States Patent
Kim et al.

(10) Patent No.: US 9,821,851 B1
(45) Date of Patent: Nov. 21, 2017

(54) VEHICLE BODY FRONT REINFORCEMENT ASSEMBLY

(71) Applicants: HYUNDAI MOTOR COMPANY, Seoul (KR); KIA MOTORS CORPORATION, Seoul (KR)

(72) Inventors: Hyun Sik Kim, Seoul (KR); Ji Woong Park, Hwaseong-si (KR); Se Hoon Jung, Seoul (KR); Soo Heung Eom, Hwaseong-si (KR); Sun Ik Jang, Seoul (KR); Sea Cheoul Song, Ansan-si (KR); Ki Bong Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/366,792

(22) Filed: Dec. 1, 2016

(30) Foreign Application Priority Data

Oct. 12, 2016 (KR) .................. 10-2016-0132335

(51) Int. Cl.

| | |
|---|---|
| *B62D 21/02* | (2006.01) |
| *B62D 21/15* | (2006.01) |
| *B62D 21/03* | (2006.01) |
| *B62D 29/00* | (2006.01) |
| *B62D 25/02* | (2006.01) |
| *B62D 25/20* | (2006.01) |
| *B62D 25/08* | (2006.01) |

(52) U.S. Cl.
CPC ........... *B62D 21/152* (2013.01); *B62D 21/02* (2013.01); *B62D 21/03* (2013.01); *B62D 25/025* (2013.01); *B62D 25/082* (2013.01); *B62D 25/2018* (2013.01); *B62D 25/2036* (2013.01); *B62D 29/007* (2013.01)

(58) Field of Classification Search
CPC ...... B62D 21/152; B62D 21/02; B62D 21/08; B62D 25/082; B62D 25/025; B62D 25/2036; B62D 29/007
USPC ...... 296/187.1, 187.09, 193.07, 209, 203.02, 296/204
See application file for complete search history.

(56) References Cited

U.S. PATENT DOCUMENTS

| | | | |
|---|---|---|---|
| 7,883,113 B2 | 2/2011 | Yatsuda | |
| 9,073,578 B2 * | 7/2015 | Chikazawa | .......... B62D 21/155 296/187.1 |

(Continued)

FOREIGN PATENT DOCUMENTS

| | | |
|---|---|---|
| KR | 20030081038 A | 10/2003 |
| KR | 100765627 B1 | 10/2007 |
| KR | 20160028259 A | 3/2016 |

*Primary Examiner* — Stephen Gordon
(74) *Attorney, Agent, or Firm* — McDonnell Boehnen Hulbert & Berghoff LLP (57) ABSTRACT

A vehicle body front reinforcement assembly includes: a front side beam connected to a front of a dash panel; a side sill connected to a side end portion of a floor panel; and a torque box extending from the dash panel to the side end portion of the floor panel and connecting a rear end of the front side beam to a front end of the side sill, wherein the side sill includes: a side sill coupler coupled to a rear end of the torque box; and a side sill extension connected to a rear end of the side sill coupler and extending towards the rear of a vehicle, and wherein the side sill coupler is made of a material having a lower tensile to strength than the material of the side sill extension.

18 Claims, 6 Drawing Sheets

(56) References Cited

U.S. PATENT DOCUMENTS

| | | |
|---|---|---|
| 2003/0189358 A1 | 10/2003 | Watanabe et al. |
| 2015/0251702 A1* | 9/2015 | Volz .................... B62D 21/152 296/187.1 |
| 2016/0059892 A1 | 3/2016 | Lee |

\* cited by examiner

VEHICLE BODY FRONT REINFORCEMENT ASSEMBLY

CROSS-REFERENCE TO RELATED APPLICATION

This application is based on and claims the benefit of priority to Korean Patent Application No. 10-2016-0132335, filed on Oct. 12, 2016 in the Korean Intellectual Property Office, the disclosure of which is incorporated herein in its entirety by reference.

TECHNICAL FIELD

The present disclosure relates to a vehicle body front reinforcement assembly.

BACKGROUND

Figure 1:
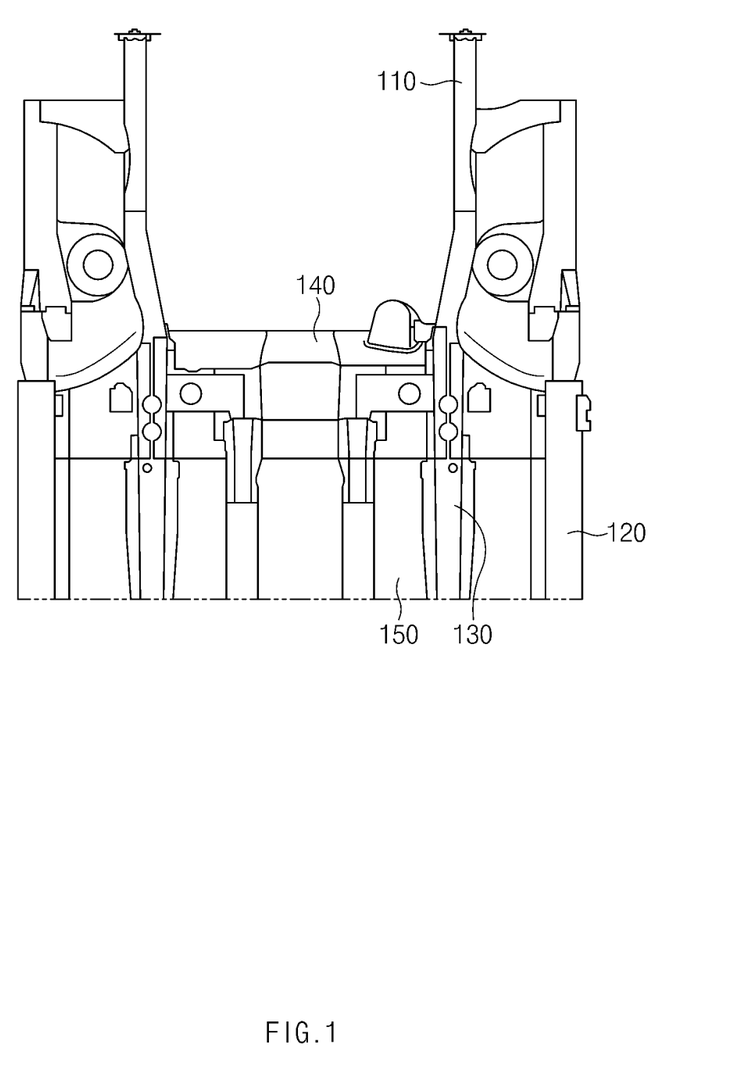
FIG. 1 is a view illustrating a conventional vehicle body front reinforcement assembly.
Figure 2:
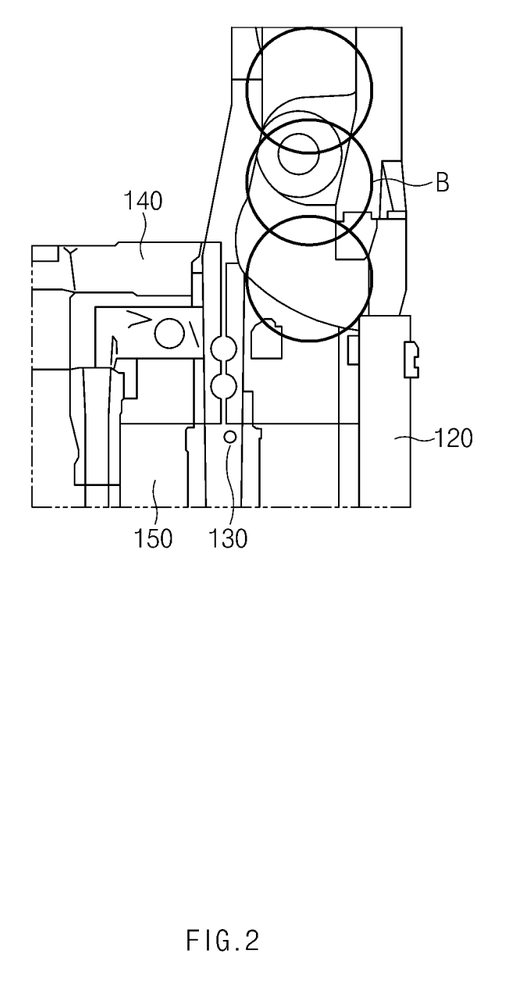
FIG. 2 is a view illustrating the conventional vehicle body front reinforcement assembly illustrated in FIG. 1 during a small overlap collision.

FIG. 1 is a view illustrating a vehicle body front reinforcement assembly according to the related art. FIG. 2 is a view illustrating the conventional vehicle body front reinforcement assembly of FIG. 1 when the vehicle experiences a small overlap collision.

The conventional vehicle body front reinforcement assembly includes a front side beam 110 extending from the front of a dash panel 140 towards an engine compartment, side sills 120 attached to each of two side end portions of a floor panel 150, and a rear lower beam 130 positioned between the side sills 120 and connected to the front side beam 110 thereby forming an assembly that extends in a substantially linear fashion from the front to the rear of the vehicle, as illustrated in FIG. 1. In addition, each side sill 120 extends in a substantially linear fashion from the front to the rear of the vehicle. The conventional vehicle body front reinforcement assembly does not include additional reinforcement between side sill 120 and rear lower beam 130. Thus, the region between side sill 120 and rear lower beam 130 is weak and vulnerable to a collision.

As illustrated in FIG. 2, when a vehicle having the conventional vehicle body front reinforcement assembly collides with a rigid object B in a small overlap collision (e.g. when the front corner of a vehicle collides with another vehicle or a rigid object such as a tree or utility pole), and the location of the collision is in or adjacent to the weakened region, the rigid object B may impact or become lodged in the weakened area, and transmit strong collision energy to the vehicle. Similarly, in a small overlap collision, the collision may force a vehicle wheel and tire from their original position into the weakened region, again imparting substantial collision energy to the vehicle. In addition, as illustrated in FIG. 2, during a small overlap collision, a vehicle having the conventional vehicle body front reinforcement assembly may rotate around the rigid object or the tire caught in the weakened region, thereby increasing the possibility of a secondary collision.

SUMMARY

The present disclosure has been made to solve the above-mentioned problems occurring in the prior art while maintaining the advantages achieved by the prior art.

Example embodiments provide an improved vehicle body front reinforcement assembly that reduces the collision energy a vehicle experiences during a small overlap collision.

Further embodiments provide an improved vehicle body front reinforcement assembly that prevents rotation of a vehicle during a small overlap collision.

According to an example embodiment of the present disclosure, a vehicle body front reinforcement assembly includes: a front side beam extending from the front of a dash panel towards a vehicle engine compartment; a side sill connected to a side end portion of a floor panel; and a torque box extending from the dash panel to the side end portion of the floor panel and connecting a rear end of the front side beam to a front end of the side sill. In this example embodiment, the side sill includes: a side sill coupler coupled to a rear end of the torque box; and a side sill extension connected to a rear end of the side sill coupler and extending towards a rear of a vehicle. The side sill coupler preferably is made of a material having a lower tensile strength than the material of the side sill extension.

In additional example embodiments, the side sill coupler may be a cold-formed material, such as a metal formed by rolling, bending, forging, extruding, etc. under ordinary temperature. The side sill extension may be a hot-formed material, such as a metal formed by hot stamping, or a cold-formed, high tensile strength steel material.

The side sill coupler may include: an inner section having a front end coupled to the torque box; and an outer section connected to the side sill coupler inner section and provided to a side end portion of the floor panel as compared to the side sill coupler inner section. The side sill coupler outer section extends further towards the rear of the vehicle than the side sill coupler inner section.

The side sill coupler outer section may have an inclined surface extending between a front surface and an outside surface.

In example embodiments, the torque box may include: an inner section having a front end coupled to the front side beam, and a rear end coupled to the side sill coupler; and an outer section having a front end coupled to an outside surface of the front side beam, and a rear end coupled to a front surface of the side sill coupler. The torque box inner section may be coupled to the bottom surface of the front side beam, the inside surface of the front side beam, or both.

The torque box may be a cold-formed, high strength steel material.

The torque box inner section may be made of a material having a tensile strength lower than the material of the torque box outer section.

Figure 5:
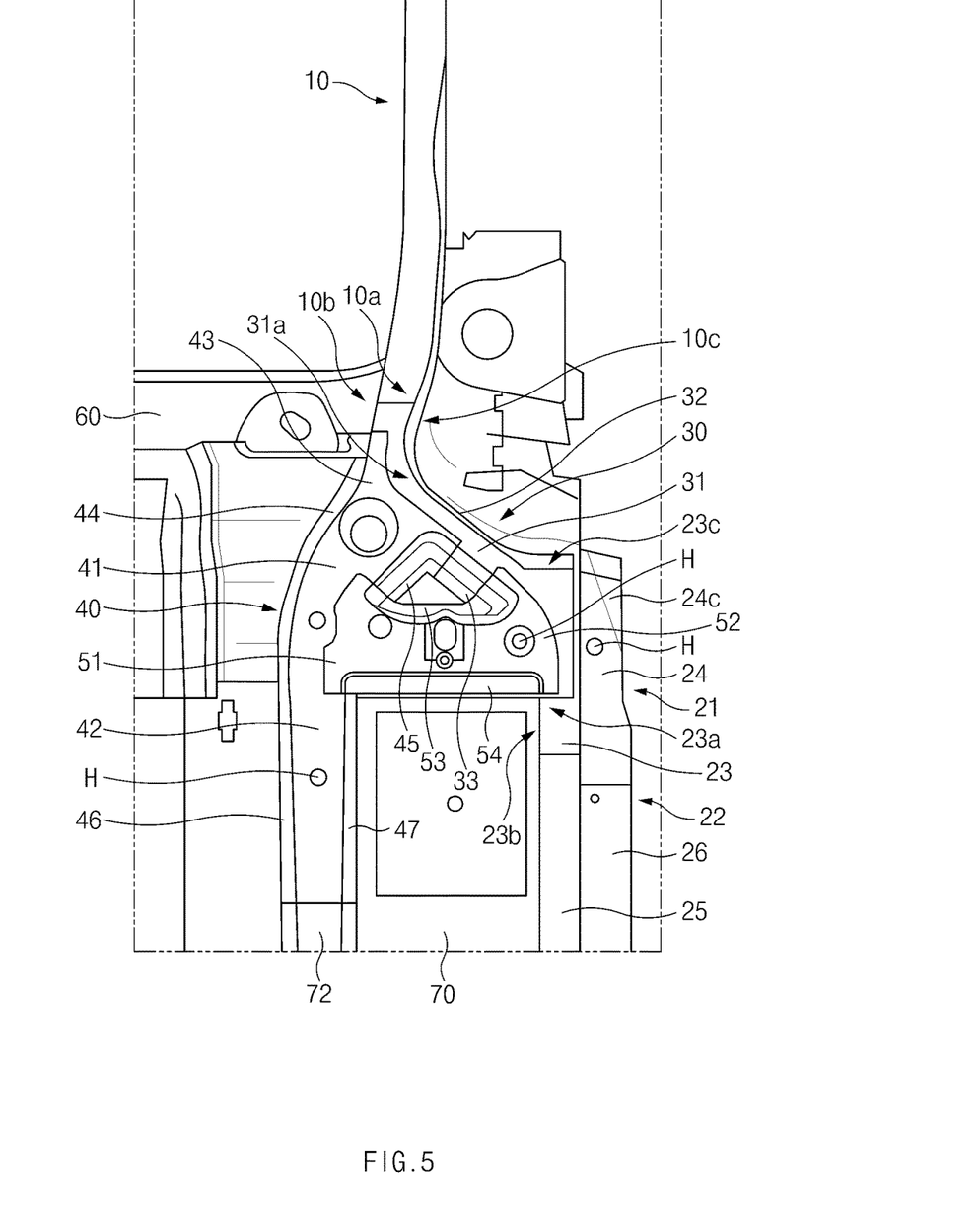
FIG. 5 is a partial enlarged view of FIG. 3.

As shown in FIG. 5, the torque box inner section may have an L-shaped ('L') cross-section, the torque box outer section may have an I-shaped ('I') cross-section, and the torque box inner section and the torque box outer section may combine to form a U-shaped ('U') cross-section.

In further example embodiments, the torque box may have a curvature. In particular example embodiments, the torque box may have a curvature that is eccentric as it extends from a side end portion of the floor panel toward a rear of the vehicle.

The torque box may have a curvature that is convex toward the rear of the vehicle.

The vehicle body front reinforcement assembly may further include a rear lower beam coupled to a front end of the torque box and extending towards the rear of the vehicle.

The vehicle body front reinforcement assembly may further include a front cross bar connecting a rear end of the torque box to the rear lower beam.

The rear lower beam may include: a rear lower beam coupler having a front end coupled to the front end of the torque box and a curvature that is eccentric as it extends from a center of the floor panel toward the rear of the vehicle; and a rear lower beam extension extending from the rear lower beam coupler towards the rear of the vehicle.

The rear lower beam coupler may have a curvature that is convex toward a front of the vehicle.

The front cross bar may connect a rear end of the rear lower beam coupler to the rear end of the torque box.

One end of the front cross bar may be coupled to the torque box, and the other end thereof may be coupled to the rear lower beam coupler. In particular example embodiments, one end of the front cross bar may be coupled a bottom surface of the torque box, an inside surface of the torque box, or both; and the other end may be coupled to a bottom surface of the rear lower beam couple, an outside surface of the rear lower beam coupler or both.

The rear lower beam may be a hot-formed, high strength steel material, and the front cross bar may be a cold-formed high strength steel material.

The side sill coupler may extend further towards the rear of the vehicle than the front cross bar.

According to another example embodiment of the present disclosure, a vehicle body front reinforcement assembly includes: a front side beam extending from a front of a dash panel towards a vehicle engine compartment; a side sill connected to a side end portion of a floor panel; a torque box connecting a rear end of the front side beam to a front end of the side sill and having a curvature that is eccentric as it extends from the side end portion of the floor panel toward a rear of a vehicle; and a rear lower beam coupled to a front end of the torque box and extending towards the rear of the vehicle, wherein the side sill includes: a side sill coupler coupled to a rear end of the torque box; and a side sill extension connected to a rear end of the side sill coupler and extending towards the rear of the vehicle, and wherein the side sill coupler has a tensile strength lower than that of the side sill extension.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Example embodiments of the present disclosure are described in detail with reference to the accompanying drawings. The same reference numbers are used throughout the drawings to refer to the same or like parts. Detailed descriptions of well-known functions and structures incorporated herein may be omitted to avoid obscuring the subject matter of the present disclosure. Other example embodiments or features may further be utilized, and other changes may be made, without departing from the scope of the subject matter presented herein. The example embodiments described herein are not meant to be limiting. Thus, aspects of the present disclosure, as generally described herein and illustrated in the figures, can be arranged, substituted, combined, separated and designed in a wide variety of different configurations, all of which are explicitly contemplated herein. Thus, the present disclosure should be construed as including all the changes, equivalents, and substitutions included in the spirit and scope of the present disclosure at the time of filing this application.

The sizes of each component, or a specific portion or configuration of a component, may be exaggerated, omitted or schematically illustrated for convenience of explanation and clarity. Therefore, the size of each component as shown in the drawings does not necessarily reflect its real size.

Figure 3:
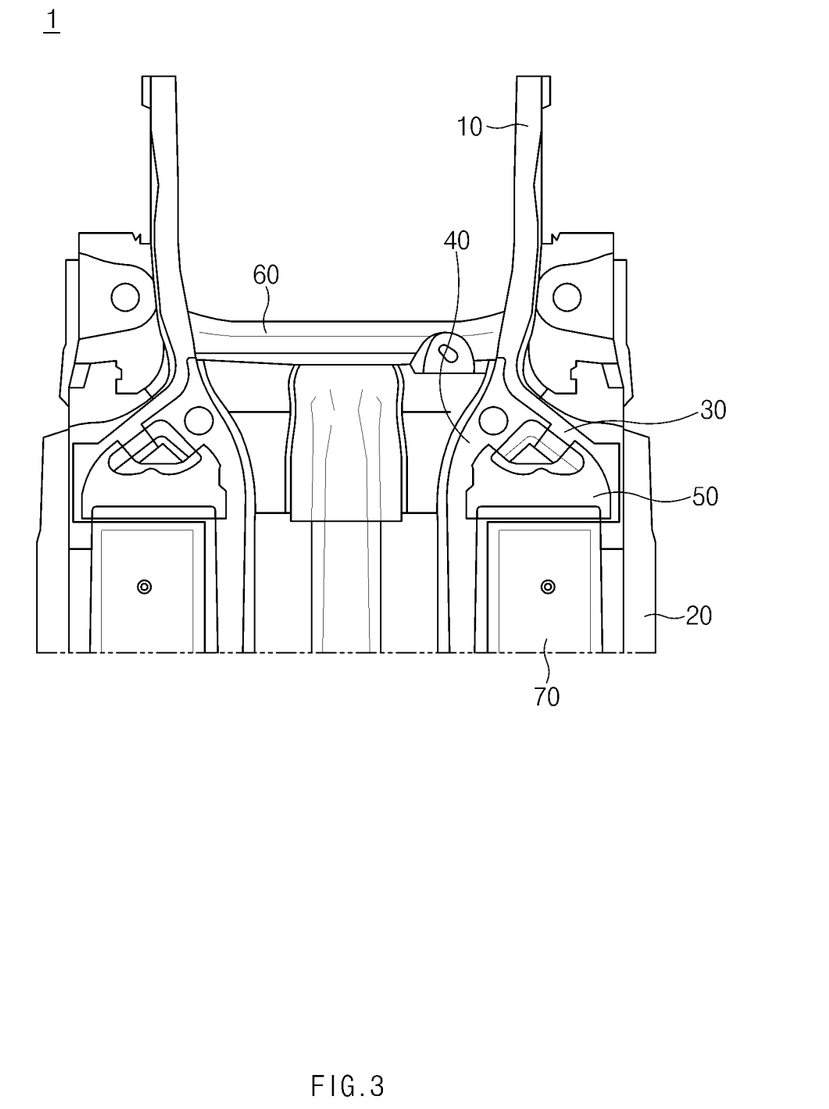
FIG. 3 is a bottom view of a vehicle body front reinforcement assembly according to an example embodiment of the present disclosure.
Figure 4:
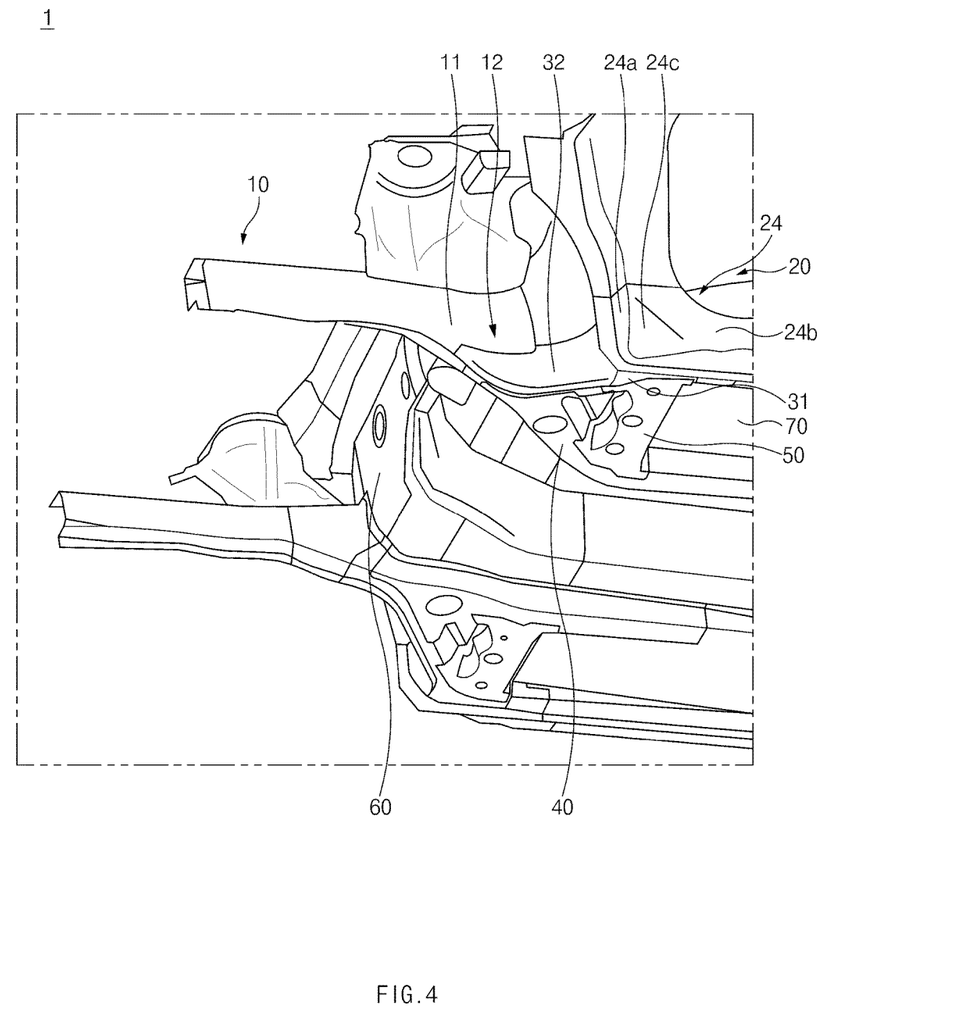
FIG. 4 is a perspective view of the vehicle body front reinforcement assembly illustrated in FIG. 3.

FIG. 3 is a bottom view of an example embodiment of an improved vehicle body front reinforcement assembly. FIG. 4 is a perspective view of the improved vehicle body front reinforcement assembly illustrated in FIG. 3.

Referring to FIG. 3, an example embodiment of an improved vehicle body front reinforcement assembly (hereinafter, referred to as a 'vehicle body front reinforcement assembly 1') includes a front side beam 10 extending from the front of a dash panel 60; a side sill 20 connected to a side end portion of a floor panel 70; a torque box 30 extending from the front of dash panel 60 to the side end portion of floor panel 70 and connecting a rear end of front side beam 10 to a front end of side sill 20; a rear lower beam 40 coupled to a front end of torque box 30 and extending towards a rear of a vehicle; and a front cross bar 50 connecting a rear end of torque box 30 to rear lower beam 40.

Front side beam 10 absorbs shocks applied from the front of the vehicle.

As illustrated in FIG. 3, one front side beam 10 extends from each of the left and right sides of the front of dash panel 60, that is, a pair of front side beams 10 is provided. As illustrated in FIG. 3, front side beam 10 extends from the front of the dash panel 60 towards an engine compartment positioned in the front end of the vehicle (not shown). As illustrated in FIG. 4, front side beam 10 has an inclined section 11 upwardly inclined along the dash panel 60 at a length predefined in the front of the dash panel 60, and a straight section 12 extending towards the front of the vehicle as much as the predefined length from the inclined section 11. Front side beam 10 may absorb the shock resulting from a collision at the front end of the vehicle.

Side sill 20 distributes the collision shock applied to the front side beam 10 to a side end portion of the floor panel 70.

As illustrated in FIG. 3, one side sill 20 is connected to each of both side end portions of floor panel 70; that is, a pair of side sills 20 is provided. As illustrated in FIG. 3, side sill 20 is disposed at the side end portion of floor panel 70, and extends from a front end of floor panel 70 towards the rear of the vehicle. Shock applied to front side beam 10 or torque box 30 resulting from a collision may be transmitted to side sill 20 through torque box 30, and side sill 20 may absorb the transmitted shock.

Torque box 30 connects front side beam 10 to side sill 20.

As illustrated in FIG. 3, one torque box 30 is installed between each front side beam 10 and each side sill 20; that is, a pair of torque boxes 30 is installed. As illustrated in FIG. 3, torque box 30 is disposed between front side beam 10 and side sill 20, and extends from the front of dash panel 60 to the side end portion of floor panel 70. As illustrated in FIG. 3, the front end of torque box 30 is coupled to the rear end of front side beam 10, and the rear end of torque box 30 is coupled to the front end of side sill 20. Torque box 30 connects the front side beam 10 to the side sill 20, thereby allowing transfer of a collision shock applied to front side beam 10 or torque box 30 to side sill 20.

Rear lower beam 40 distributes the shock applied to the front side beam 10 toward the center of the vehicle.

As illustrated in FIG. 3, one rear lower beam 40 is installed to each of the left and right regions of a center part of floor panel 70; that is, a pair of rear lower beams 40 is installed. As illustrated in FIG. 3, rear lower beam 40 is disposed at the center part of floor panel 70 at a predefined spacing from side sill 20, and extends towards the rear of the vehicle.

As illustrated in FIG. 3, rear lower beam 40 has a front end coupled to the front end of torque box 30. Shock applied to front side beam 10 or torque box 30 resulting from a collision may be transmitted to rear lower beam 40 through torque box 30, and rear lower beam 40 may absorb the transmitted shock.

Front cross bar 50 supports side sill 20.

As illustrated in FIG. 3, a front cross bar 50 is installed between each side sill 20 and each rear lower beam 40; that is, a pair of front cross bars 50 is installed. As illustrated in FIG. 3, front cross bar 50 traverses floor panel 70 between side sill 20 and rear lower beam 40 in the side of the vehicle. One end of front cross bar 50 is coupled to the rear end of torque box 30, and the other end of front cross bar 50 is coupled to a rear end of a rear lower beam coupler 41 (described further below; see FIG. 5).

Front cross bar 50 supports torque box 30 and side sill 20 in the side of the vehicle from the center part of floor panel 70 and may also connect side sill 20 to rear lower beam 40 at the same time. Front cross bar 50 supports side sill 20 and torque box 30 so that side sill 20 and torque box 30 are not deformed toward the center part of the floor panel 70 when a collision shock is applied to side sill 20 and torque box 30. In addition, front cross bar 50 may absorb the shock applied to side sill 20 and torque box 30 or transfer the shock to the rear lower beam 40.

Figure 6:
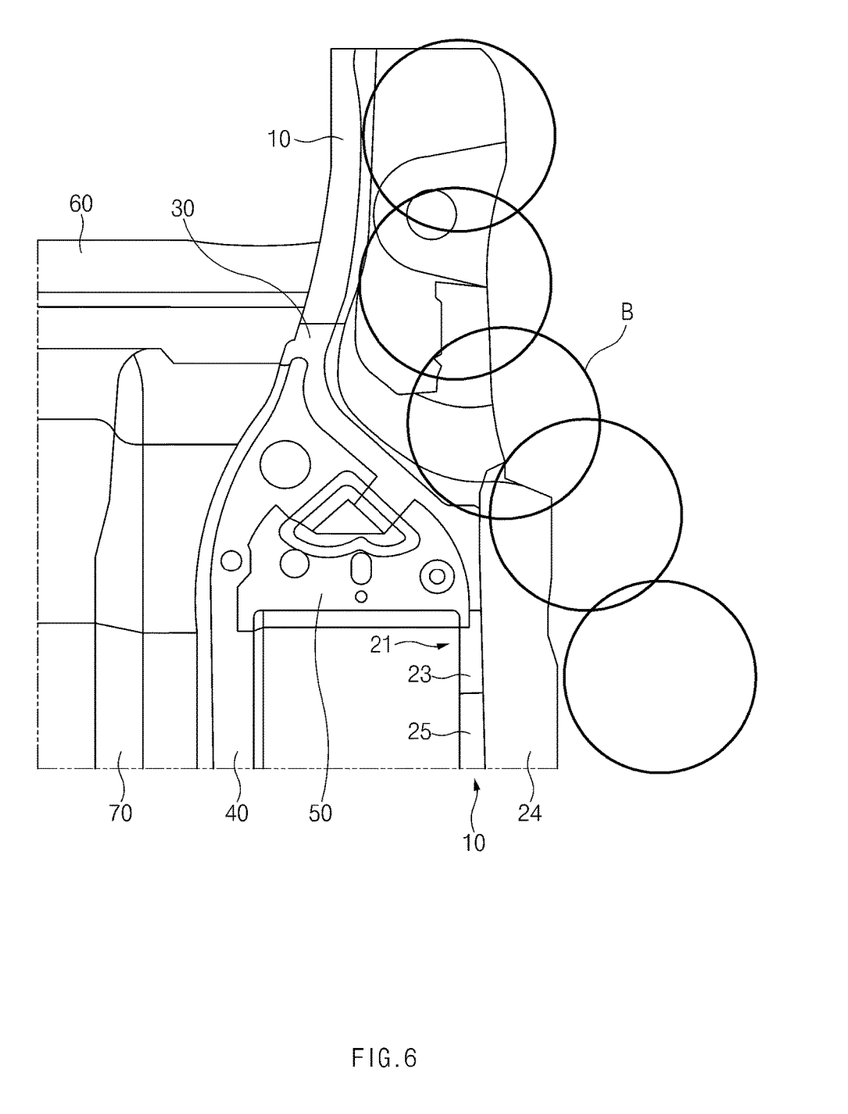
FIG. 6 is a view illustrating an example embodiment of the improved vehicle body front reinforcement assembly of FIG. 3 during a small overlap collision.

FIG. 5 is a partial enlarged view of FIG. 3, and FIG. 6 is a view illustrating the example improved vehicle body front reinforcement assembly of FIG. 5 during a small overlap collision.

To reduce the collision energy applied to the vehicle at the time of a small overlap collision, and to prevent the vehicle from being rotated during the collision, it is desirable to rapidly guide a rigid obstacle B, or a tire or wheel forced from its original position due to the collision (hereinafter, referred to as 'rigid obstacle B, or the like') away from the vehicle so that it is no longer overlapped with the vehicle. For example, by rapidly guiding the rigid obstacle B, or the like, towards the side of the vehicle and to a position where it is no longer overlapped with the vehicle, the rigid obstacle B, or the like may be moved to the rear of the vehicle and the vehicle may pass the rigid obstacle.

As illustrated in FIG. 5, torque box 30 may have a curvature, and in particular, an arch shape extending in an eccentric fashion to the side end portion of floor panel 70 toward the rear of the vehicle. For example, torque box 30 may have a convex shape as it extends toward the rear of the vehicle. The curvature of torque box 30 may assist in rapidly guiding the rigid obstacle B, or the like, to the side of the vehicle during a small overlap collision.

In addition, torque box 30 may include an torque box inner section 31 having a front end coupled to at least one of a bottom surface 10a and an inside surface 10b of front side beam 10 and a rear end coupled to at least one of a bottom surface 23a and an inside surface 23b of side sill coupler 21, and an torque box outer section 32 having a front end coupled to an outside surface 10c of front side beam 10 and a rear end coupled to a front surface 23c of side sill coupler 21.

As illustrated in FIG. 5, the torque box inner section 31 may have an L-shaped ('L') cross section, such that the front end thereof is coupled to bottom surface 10a and inside surface 10b of front side beam 10, and the rear end thereof is coupled to bottom surface 23a and inside surface 23b of side sill coupler 21 (further described below). In particular, the front end of torque box inner section 31 may extend up to the point at which straight section 12 of front side beam 10 starts. In addition, as illustrated in FIG. 5, an inside flange 33 disposed in an inside of torque box inner section 31 is coupled to dash panel 60, and an outside flange (not shown) connected to an outside of the torque box outer section 32 is coupled to torque box outer section 32.

Torque box inner section 31 is preferably made of a cold-formed, high strength steel material. For example, the torque box inner section 31 may be made of a cold-formed, high strength steel material having a tensile strength of 100 kg/mm$^2$ or more.

As illustrated in FIG. 5, torque box outer section 32 having an I-shaped ('I') cross section is coupled to torque box inner section 31 having an L-shaped ('L') cross section, resulting in torque box 30 having a U-shaped ('U') cross section. In addition, the front end of torque box outer section 32 is coupled to an outside surface 10c of front side beam 10, the rear end of torque box outer section 32 is coupled to the front surface 23c of side sill coupler 21, and an intermediate part between the front end and the rear end of torque box 30 is coupled to the dash panel 60.

As illustrated in FIG. 4, torque box outer section 32 preferably has a height about 0.5 to about 0.8 times the height of straight section 12 of front side beam 10. A floor side bar 72 in the center part of the floor panel 70 may be set as a reference for the height.

Torque box outer section 32 is preferably made of a cold-formed high strength steel material having a tensile strength higher than the material of torque box inner section 31. For example, the torque box outer section 32 may be formed of a cold-formed, high strength steel material having a tensile strength of 120 kg/mm$^2$ or more.

Because torque box 30 is made of a cold-formed high strength steel material that is less brittle than a hot-formed material, it is possible to prevent torque box 30 from being broken by the shock resulting from a collision with rigid obstacle B, or the like in a small overlap collision. Because it retains its form, torque box 30 may more rapidly guide the rigid obstacle B, or the like, to the side of the vehicle during a small overlap collision.

Side sill 20 also assists in guiding rigid obstacle B, or the like, away from an overlapped position. For example, when rigid obstacle B, or the like, brushes through the side sill 20 during a small overlap collision, it is guided away from an overlapped position, and may be then guided to the rear of the vehicle. To effectively reduce overlap, side sill 20 may include a side sill coupler 21 coupled to the rear end of torque box 30, and a side sill extension 22 connected to a rear end of side sill coupler 21 and extending towards the rear of the vehicle.

As illustrated in FIG. 5, side sill coupler 21 is disposed at an edge portion of floor panel 70 at which the front end and a side end portion of floor panel 70 are connected. Side sill coupler 21 may include an inner section 23 having a front end coupled to the rear end of torque box 30, and an outer section 24 connected to side sill coupler inner section 23 and provided to the side end portion of the floor panel 70 as compared to the side sill coupler inner section 23.

Side sill coupler inner section 23 extends farther towards the rear of the vehicle than the rear end of the front cross bar 50. The bottom surface 23a and the inside surface 23b of the side sill coupler inner section 23 are coupled to torque box inner section 31, and the front surface 23c of the side sill coupler inner section 23 is coupled to torque box outer section 32.

Side sill coupler outer section 24 extends farther towards the rear of the vehicle than the side sill coupler inner section 23. As illustrated in FIG. 4, side sill coupler outer section 24 includes an inclined surface 24c that is inclined between the front surface 24a thereof and the outside surface 24b thereof. Inclined surface 24c assists in guiding the rigid obstacle B, or the like arriving at the side sill coupler outer section 24 towards the rear of the vehicle.

The rigid obstacle B, or the like passing through torque box 30 arrives at side sill coupler 21. Preferably, Side sill coupler 21 is made of a material having a lower tensile strength than the material of side sill extension 22, resulting in side sill coupler being naturally deformed toward the rear of the vehicle by rigid obstacle B, or the like. In an example embodiment, side sill coupler 21 may be made of a cold-formed material having a tensile strength lower than the material of side sill extension 22.

When the side sill coupler 21 is deformed toward the rear of the vehicle, the path of the rigid obstacle B, or the like, changes toward the rear of the vehicle. Therefore, the rigid obstacle B, or the like, moves along the altered movement path and may be then guided away from an overlapped position and toward the rear of the vehicle. However, because side sill coupler outer section 24 of side sill coupler 21 extends farther towards the rear of the vehicle than side sill coupler inner section 23, the side sill coupler outer section 24 may be more deeply deformed toward the rear of the vehicle than the side sill coupler inner section 23. The deformation of side sill coupler outer section 24 allows rigid obstacle B, or the like, to more easily move to a position that is not overlapped with the vehicle.

As illustrated in FIG. 5, side sill extension 22 may include an inner section 25 extending from the rear end of side sill coupler inner section 23 towards the rear of the vehicle, and an outer section 26 connected to the inner side sill extension 25 and extending from the rear end of side sill coupler outer section 24 towards the rear of the vehicle.

When side sill coupler 21 is deformed toward the rear of the vehicle by the rigid obstacle B, or the like, side sill extension 22 supports side sill coupler 21 so that it is not completely broken as a result of the collision. To this end, side sill extension 22 may be made of a material having a tensile strength higher than the material of side sill coupler 21; for example, a hot-formed material or a cold-formed high strength steel material.

Rear lower beam 40 firmly supports torque box 30 and front cross bar 50. As illustrated in FIG. 5, in an example embodiment, rear lower beam 40 may include a rear lower beam coupler 41 having a front end coupled to the front end of torque box 30. Rear lower beam coupler may have a curvature, an, in particular example embodiments, may be an arch shape extending from the floor panel 70 toward the rear of the vehicle. Rear lower beam 40 may also include a rear lower beam extension 42 extending from rear lower beam coupler 41 towards the rear of the vehicle.

As illustrated in FIG. 5, rear lower beam coupler 41 has an arch shape which is convex toward the front of the vehicle. A front flange 43 connected to the front end of the rear lower beam coupler 41 is coupled to a bottom surface 31a of torque box inner section 31. An inside flange 44 disposed in an inside of rear lower beam coupler 41 and an outside flange 45 disposed on an outside of the rear lower beam coupler are coupled to dash panel 60. A rear end of rear lower beam coupler 41 is coupled to the other end of front cross bar 50. Rear lower beam coupler 41 may prevent torque box 30 from being deformed toward the center of the vehicle during a collision and may absorb the shock applied to torque box 30 and front side beam 10, by supporting the front end of torque box 30 toward the side of the vehicle. In addition, rear lower beam coupler 41 may prevent front cross bar 50, and torque box 30 and side sill 20 supported by front cross bar 50, from being deformed toward the center of the vehicle and may absorb the shock applied to side sill 20, torque box 30, and front cross bar 50, by supporting front cross bar 50 toward the side of the vehicle.

As illustrated in FIG. 5, rear lower beam extension 42 extends from the rear end of the rear lower beam coupler 41 towards the rear of the vehicle. A bottom surface of rear lower beam extension 42 is coupled to a floor side bar 72 protruding from floor panel 70. An inside flange 46 disposed in an inside of rear lower beam extension 42 and an outside flange 47 disposed on an outside thereof are coupled to floor panel 70. Rear lower beam extension 41 may prevent rear lower beam coupler 41 from being deformed toward the rear of the vehicle and may absorb the shock applied to rear lower beam coupler 41, by supporting rear lower beam coupler 41 toward the front of the vehicle.

Rear lower beam 42 has a U-shaped "cross-section" having an opening in one side thereof, and is coupled to dash panel 60 and floor panel 70 so that the opening is closed by dash panel 60 and floor panel 70. In addition, rear lower beam 40 is made of a material having a high tensile strength so as to firmly support torque box 30 and front cross bar 50. For example, rear lower beam 40 may be made of a hot-formed material having a tensile strength of 150 kg/mm$^2$ or more.

Front cross bar 50 firmly connects side sill 20 to rear lower beam 40. For example, as illustrated in FIG. 5, an outside flange 51 connected to an outside end portion of front cross bar 50 may be coupled to the rear end of torque box inner section 31, and an inside flange 52 disposed in an inside end portion of front cross bar 50 may be coupled to the rear end of rear lower beam coupler 41. As also illustrated in FIG. 5, a front flange 53 connected to a front side end portion of the front cross bar 50 and a rear flange 54 connected to a rear side end portion of front cross bar 50 may be coupled to dash panel 60.

Front cross bar 50 has a U-shaped cross section having an opening in one side, and is coupled to dash panel 60 so that the opening is closed by dash panel 60. In example embodiments, the front cross bar may be made of a cold-formed material.

In further example embodiments, welding holes H are punched in predefined welding positions of the respective structures described herein in order to allow welding various pieces together.

FIG. 6 illustrates the improved vehicle body front reinforcement assembly illustrated of FIG. 5 during a small overlap collision.

During the small overlap collision occurs, front side beam 10 guides the rigid obstacle B, or the like toward the torque box 30.

Next, torque box 30 guides the rigid obstacle B, or the like, toward side sill coupler 21. Torque box 30 is supported by the rear lower beam 40 and the front cross bar 50, and thus resists being deformed toward the center of the vehicle during the collision.

Thereafter, the rigid obstacle B, or the like guided toward the side sill coupler 21 is guided away from the vehicle while deforming the side sill coupler 21 toward the rear of the vehicle, and is then moved to the rear of the vehicle.

In the vehicle body front reinforcement assembly 1, side sill coupler 21 is made so as to be easily deformed toward the rear of the vehicle by the rigid obstacle B, or the like. Deformation of side sill coupler 21 reduces collision strength between the rigid obstacle B, or the like and side sill coupler 21, thereby reducing the collision energy applied to the vehicle and preventing the vehicle from being rotated by the collision energy at the same time. Therefore, in the vehicle body front reinforcement assembly 1, it possible to prevent a driver, a passenger, or the like from being injured, or the vehicle from being damaged by a small overlap collision, or from a secondary collision caused by the rotation of the vehicle.

In vehicle body front reinforcement assembly 1 as described above, the curvature of torque box 30 assists in guiding the rigid obstacle B, or the like toward the side of the vehicle, thereby making it possible to reduce or eliminate overlap. Therefore, in vehicle body front reinforcement assembly 1, the collision energy applied to the vehicle by the rigid obstacle B, or the like, may be more effectively reduced, and the rotation of the vehicle by the collision energy may be more effectively prevented at the same time.

As described above, according to the example embodiments of the present disclosure, the vehicle body front reinforcement assembly has the following effects.

First, according to the present disclosure, the side sill coupler which is in contact with the rigid obstacle, or the like may be formed to be easily deformed toward the rear of the vehicle by the rigid obstacle, or the like. Therefore, according to the present disclosure, since the collision strength between the rigid obstacle, or the like and the side sill coupler may be reduced by the deformation of the side sill coupler, the collision energy applied to the vehicle by the rigid obstacle, or the like is reduced and the rotation of the vehicle by the collision energy is prevented at the same time, thereby making it possible to prevent the driver, the passenger from being injured, or the vehicle from being damaged by the small overlap collision and the secondary collision caused by the rotation of the vehicle by the small overlap collision.

Second, according to the present disclosure, the rigid obstacle is naturally guided toward the side of the vehicle through the torque box having the arch shape at the time of the occurrence of the small overlap collision, thereby making it possible to deviate the rigid obstacle from the vehicle. Therefore, according to the present disclosure, the collision energy applied to the vehicle by the rigid obstacle may be more effectively reduced and the rotation of the vehicle by the collision energy may be more effectively prevented at the same time.

Hereinabove, although the present disclosure has been described with reference to example embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle body front reinforcement assembly comprising:
   a front side beam connected to a front of a dash panel;
   a side sill connected to a side end portion of a floor panel; and
   a torque box extending from the dash panel to the side end portion of the floor panel and connecting a rear end of the front side beam to a front end of the side sill,
   wherein the side sill includes:
   a side sill coupler coupled to a rear end of the torque box; and
   a side sill extension connected to a rear end of the side sill coupler and extending towards a rear of a vehicle,
   and wherein the side sill coupler is made of material having a lower tensile strength than that of the material for the side sill extension.

2. The vehicle body front reinforcement assembly according to claim 1, wherein the side sill coupler is made of a cold-formed material, and
   the side sill extension is made of a hot-formed material or a cold-formed, high strength steel material.

3. The vehicle body front reinforcement assembly according to claim 1, wherein the side sill coupler comprises:
   a side sill coupler inner section having a front end coupled to the torque box; and
   a side sill coupler outer section connected to the side sill coupler inner section and provided to a side end portion of the floor panel as compared to the side sill coupler inner section,
   and wherein a rear end of the side sill coupler outer section extends farther towards the rear of the vehicle than a rear end of the side sill coupler inner section.

4. The vehicle body front reinforcement assembly according to claim 3, wherein the side sill coupler outer section includes an inclined surface extending between a front surface and an outside surface.

5. The vehicle body front reinforcement assembly according to claim 1, wherein the torque box includes:
   a torque box inner section having a front end coupled to at least one of a bottom surface and an inside surface of the front side beam, and a rear end coupled to at least one of a bottom surface and an inside surface of the side sill coupler; and
   a torque box outer section having a front end coupled to an outside surface of the front side beam, and a rear end coupled to a front surface of the side sill coupler.

6. The vehicle body front reinforcement assembly according to claim 5, wherein the torque box is made of a cold-formed, high strength steel material.

7. The vehicle body front reinforcement assembly according to claim 6, wherein the torque box inner section is made of a material having a lower tensile strength lower than the material for the torque box outer section.

8. The vehicle body front reinforcement assembly according to claim 7, wherein the torque box inner section has an L-shaped cross section,
   the torque box outer section has an I-shaped cross section, and
   the torque box inner section and the torque box outer section are coupled to each other to form a U-shaped cross section.

9. The vehicle body front reinforcement assembly according to claim 1, wherein the torque box has a curvature.

10. The vehicle body front reinforcement assembly according to claim 9, wherein the curvature of the torque box is convex toward the rear of the vehicle.

11. The vehicle body front reinforcement assembly according to claim 1, further comprising a rear lower beam coupled to a front end of the torque box and extending towards the rear of the vehicle.

12. The vehicle body front reinforcement assembly according to claim 11, further comprising a front cross bar connecting a rear end of the torque box to the rear lower beam.

13. The vehicle body front reinforcement assembly according to claim 12, wherein the rear lower beam includes:
   a rear lower beam coupler having a front end coupled to the front end of the torque box and having a curvature toward the rear of the vehicle; and
   a rear lower beam extension extending from the rear lower beam coupler towards the rear of the vehicle.

14. The vehicle body front reinforcement assembly according to claim 13, wherein the curvature of the rear lower beam coupler is convex toward a front of the vehicle.

15. The vehicle body front reinforcement assembly according to claim 14, wherein the front cross bar connects a rear end of the rear lower beam coupler to the rear end of the torque box.

16. The vehicle body front reinforcement assembly according to claim 12, wherein the rear lower beam is made of a hot-formed, high strength steel material, and the front cross bar is made of a cold-formed high strength steel material.

17. The vehicle body front reinforcement assembly according to claim 12, wherein the side sill coupler extends farther towards the rear of the vehicle than the front cross bar.

18. A vehicle body front reinforcement assembly comprising:
   a front side beam connected to a front of a dash panel;
   a side sill connected to a side end portion of a floor panel;
   a torque box connecting a rear end of the front side beam to a front end of the side sill and having a curvature toward a rear of a vehicle; and
   a rear lower beam coupled to a front end of the torque box and extending towards the rear of the vehicle,
   wherein the side sill includes:
   a side sill coupler coupled to a rear end of the torque box; and
   a side sill extension connected to a rear end of the side sill coupler and extending towards the rear of the vehicle, and wherein
   the side sill coupler is made of a material having a tensile strength lower than that of the material of the side sill extension.

* * * * *

US009821851C1

(12) EX PARTE REEXAMINATION CERTIFICATE (137th)
Ex Parte Reexamination Ordered under 35 U.S.C. 257

United States Patent
Kim et al.

(10) Number: US 9,821,851 C1
(45) Certificate Issued: Sep. 25, 2018

(54) VEHICLE BODY FRONT REINFORCEMENT ASSEMBLY

(71) Applicants: HYUNDAI MOTOR COMPANY, Seoul (KR); KIA MOTORS CORPORATION, Seoul (KR)

(72) Inventors: Hyun Sik Kim, Seoul (KR); Ji Woong Park, Hwaseong-si (KR); Se Hoon Jung, Seoul (KR); Soo Heung Eom, Hwaseong-si (KR); Sun Ik Jang, Seoul (KR); Sea Cheoul Song, Ansan-si (KR); Ki Bong Park, Seoul (KR)

(73) Assignees: HYUNDAI MOTOR COMPANY, Seocho-Gu, Seoul (KR); KIA MOTORS CORPORATION, Seocho-Gu, Seoul (KR)

Supplemental Examination Request:
No. 96/000,261, Jun. 25, 2018

Reexamination Certificate for:
Patent No.: 9,821,851
Issued: Nov. 21, 2017
Appl. No.: 15/366,792
Filed: Dec. 1, 2016

(51) Int. Cl.
B62D 21/02 (2006.01)
B62D 21/15 (2006.01)
B62D 21/03 (2006.01)
B62D 29/00 (2006.01)
B62D 25/02 (2006.01)
B62D 25/20 (2006.01)
B62D 25/08 (2006.01)

(52) U.S. Cl.
CPC .......... *B62D 21/152* (2013.01); *B62D 21/02* (2013.01); *B62D 21/03* (2013.01); *B62D 25/025* (2013.01); *B62D 25/082* (2013.01); *B62D 25/2018* (2013.01); *B62D 25/2036* (2013.01); *B62D 29/007* (2013.01)

(58) Field of Classification Search
None
See application file for complete search history.

(56) References Cited

To view the complete listing of prior art documents cited during the supplemental examination proceeding and the resulting reexamination proceeding for Control Number 96/000,261, please refer to the USPTO's public Patent Application Information Retrieval (PAIR) system under the Display References tab.

*Primary Examiner* — Peter C English

(57) ABSTRACT

A vehicle body front reinforcement assembly includes: a front side beam connected to a front of a dash panel; a side sill connected to a side end portion of a floor panel; and a torque box extending from the dash panel to the side end portion of the floor panel and connecting a rear end of the front side beam to a front end of the side sill, wherein the side sill includes: a side sill coupler coupled to a rear end of the torque box; and a side sill extension connected to a rear end of the side sill coupler and extending towards the rear of a vehicle, and wherein the side sill coupler is made of a material having a lower tensile to strength than the material of the side sill extension.

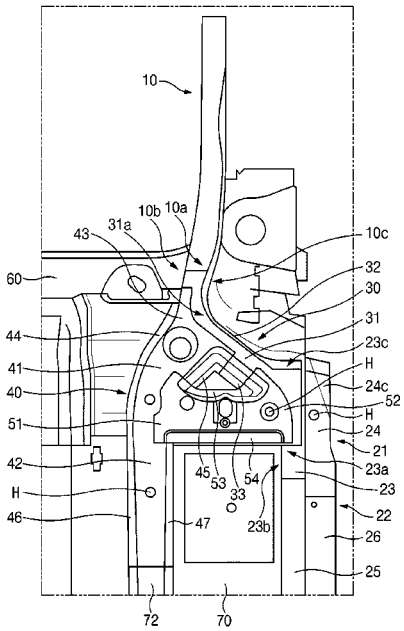

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1, 2, 11-16 and 18 is confirmed.

Claims 3-10 and 17 were not reexamined.

\* \* \* \* \*